(12) United States Patent
Grieb et al.

(10) Patent No.: US 9,103,469 B2
(45) Date of Patent: Aug. 11, 2015

(54) ARRANGEMENT FOR SEALING LINE INTERFACES IN A MOTOR VEHICLE

(75) Inventors: Andreas Grieb, Stuttgart (DE); Kai Wustlich, Aichwald (DE); Matthias Schall, Ostfildern-Ruit (DE)

(73) Assignee: MAHLE BEHR GMBH & CO. KG, Stuttgart (DE)

( * ) Notice: Subject to any disclaimer, the term of this patent is extended or adjusted under 35 U.S.C. 154(b) by 76 days.

(21) Appl. No.: 14/000,955

(22) PCT Filed: Feb. 23, 2012

(86) PCT No.: PCT/EP2012/053115
§ 371 (c)(1),
(2), (4) Date: Oct. 30, 2013

(87) PCT Pub. No.: WO2012/113893
PCT Pub. Date: Aug. 30, 2012

(65) Prior Publication Data
US 2014/0042713 A1     Feb. 13, 2014

(30) Foreign Application Priority Data

Feb. 23, 2011   (DE) .......................... 10 2011 004 560

(51) Int. Cl.
*F16L 5/02*     (2006.01)
*B60R 13/08*    (2006.01)

(52) U.S. Cl.
CPC ................ *F16L 5/02* (2013.01); *B60R 13/0846* (2013.01); *F16L 5/025* (2013.01)

(58) Field of Classification Search
CPC ............ B60R 13/0846; B60R 13/0838; B60R 13/0853; F16L 5/02; F16L 5/025; F16L 5/027; F16L 5/10; H02G 3/088
USPC ............ 296/191, 192, 193.09, 208; 277/315, 277/602, 604, 606, 616, 636
See application file for complete search history.

(56) References Cited

U.S. PATENT DOCUMENTS

| 4,758,028 A | * | 7/1988 | Davies et al. ................. 285/189 |
| 5,345,813 A | * | 9/1994 | Flessas ............................. 73/46 |

(Continued)

FOREIGN PATENT DOCUMENTS

| DE | 197 38 825 A1 | 3/1999 |
| DE | 699 02 505 T2 | 3/2003 |

(Continued)

OTHER PUBLICATIONS

International Search Report, PCT/EP2012/053115, Jun. 25, 2012, 2 pgs.
German Search Report, DE 10 2011 004 560.0, Oct. 6, 2011, 8 pgs.

*Primary Examiner* — Jason S Daniels
(74) *Attorney, Agent, or Firm* — Paul D. Strain, Esq.; Strain & Strain PLLC

(57) ABSTRACT

The invention relates to an arrangement for sealing line interfaces in a motor vehicle in which lines from an engine compartment of the motor vehicle are led into a vehicle interior, wherein the engine compartment is separated from the vehicle interior by a partition which has an opening, through which the lines are led, and the opening is closed on the vehicle interior side by a seal, which is fastened to a functional unit arranged in the vehicle interior. In order to enable a reliable sealing function despite the assembly tolerance to be compensated, a flange of the functional unit that bears the seal can be moved relative to the functional unit, or the seal is movably arranged on the flange, which is rigidly fastened to the functional unit.

9 Claims, 4 Drawing Sheets

(56) References Cited

U.S. PATENT DOCUMENTS

Figure 1:
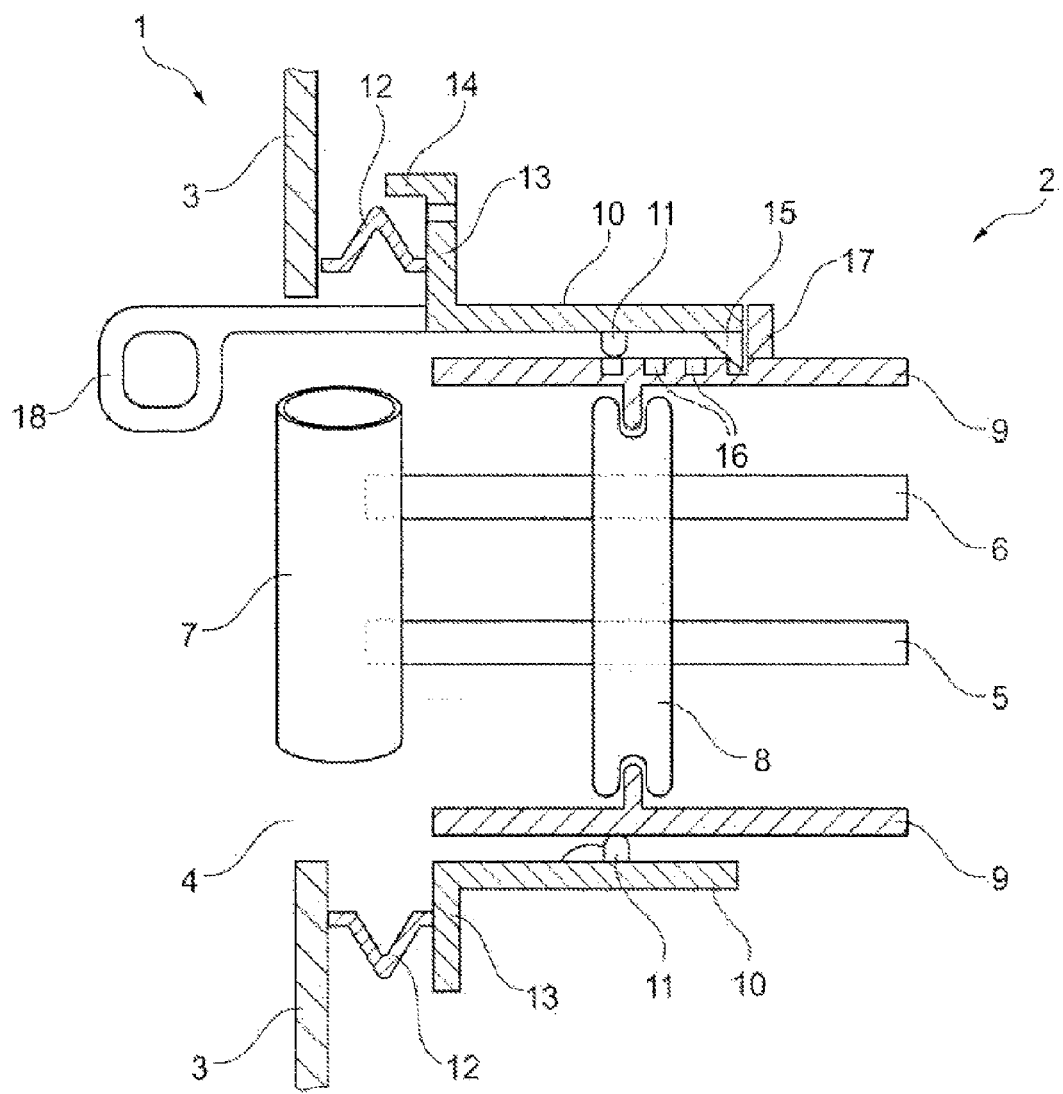

| | | | |
|---|---|---|---|
| 5,704,656 A * | 1/1998 | Rowe | 285/93 |
| 6,981,737 B2 * | 1/2006 | Welsh | 296/208 |
| 7,388,156 B2 * | 6/2008 | Knagge | 174/152 G |
| 2003/0201613 A1 * | 10/2003 | Matczak et al. | 277/602 |
| 2008/0265526 A1 * | 10/2008 | Cummings | 277/606 |
| 2009/0102139 A1 * | 4/2009 | Noro et al. | 277/628 |
| 2011/0018210 A1 * | 1/2011 | Beele | 277/606 |

FOREIGN PATENT DOCUMENTS

| | | |
|---|---|---|
| DE | 10 2006 002 962 A1 | 6/2007 |
| DE | 10 2007 005 371 A1 | 8/2007 |
| FR | 2 380 911 A1 | 9/1978 |
| GB | 2 317 643 A | 4/1998 |

* cited by examiner

ARRANGEMENT FOR SEALING LINE INTERFACES IN A MOTOR VEHICLE

CROSS-REFERENCE TO RELATED PATENT APPLICATIONS

This application is a National Stage of International Application No. PCT/EP2012/053115, filed Feb. 23, 2012, which is based upon and claims the benefit of priority from prior German Patent Application No. 10 2011 004 560.0, filed Feb. 23, 2011, the entire contents of all of which are incorporated herein by reference in their entirety.

The invention relates to an arrangement for sealing line interfaces in a motor vehicle in which at least one line from the engine compartment of the motor vehicle is passed into a vehicle interior, wherein the engine compartment is separated from the vehicle interior by a partition which has an opening through which the at least one line is passed and the opening is closed on the vehicle interior side by a seal which is fastened to a functional unit arranged in the vehicle interior.

In a motor vehicle, functional units are arranged in the vehicle interior, said functional units having to be connected via lines for the operation thereof to components which are arranged in the engine compartment of the motor vehicle. For example, media lines which conduct coolant or cooling water have to be passed from an air conditioning unit which is positioned in the vehicle interior to the engine compartment, as parts of the cooling devices, for example, are arranged in the vicinity of the engine. Generally, the engine compartment is separated from the vehicle interior by a partition which has an opening in the form of a through-hole, through which the media lines which transport the coolant or the cooling water are passed.

In order to prevent dust, moisture, odors and even noise interference from the engine compartment from reaching the vehicle interior, the opening in the partition between the engine compartment and the vehicle interior is closed by one or more seals. In addition to the sealing function, the seal also has to be able to compensate assembly tolerances between the functional unit and the partition in all spatial directions, when installing the functional unit, without the actual functionality thereof being impaired. Here, it is critical to compensate for assembly tolerances in the direction of travel of the motor vehicle as many seals produce their sealing function by compression of the sealing material. This means that a minimum compression has to be ensured in the entire area of the assembly tolerances, in order to ensure the sealing function. However, the compression forces acting on the seal should also not be too high as too great a deformation of the seal in turn impairs the sealing function thereof. As the compensation of assembly tolerances in the direction of travel, which typically is in the direction of compression of the seal, has a considerable influence on the functionality of the seal, when selecting the material for the seal it has to be considered whether the seal is able to ensure its sealing function in a reliable manner when the assembly tolerance present has to be compensated. This considerably restricts the choice of potential sealing materials and also influences the potential design of the seal.

The object of the invention, therefore, is to provide an arrangement for sealing line interfaces in a motor vehicle in which a reliable sealing function is achieved, despite the assembly tolerance to be compensated.

According to the invention, the object is achieved by a flange of the functional unit bearing the seal being configured to be movable relative to the functional unit or the seal being movably arranged on the flange which is rigidly fastened to the functional unit. This has the advantage that a decoupling is achieved of the sealing function from the compensation of the assembly tolerance of the functional unit in the direction of travel of the motor vehicle. The seal in this case simply fulfills the function of sealing the opening in the partition of the motor vehicle, whilst the mobility of the seal and/or mobility of the flange are responsible for compensating for the assembly tolerance of the functional unit in the direction of travel. Due the optimal sealability of the seal which is thus present, it is ensured that no air or water from the engine compartment is able to penetrate in the direction of the vehicle interior and sufficient acoustic damping between the engine compartment and the vehicle interior is ensured so that no disruptive noise is transmitted from the engine compartment into the vehicle interior.

Advantageously, the seal is fastened to a slide which is movably mounted relative to the longitudinal extent of the flange which is rigidly arranged on the functional unit and which is preferably configured approximately perpendicular to the opening of the partition. The compensation of the assembly tolerance is ensured by means of the movable slide, said assembly tolerance having to be compensated when installing the functional unit in the motor vehicle. Only when the compensation of the assembly tolerance is approximately set, by displacing the flange fixedly arranged on the functional unit below the slide, is the seal compressed against the partition by the movement of the slide in the direction of the partition so that seals may be used which consist of the most varied sealing materials, because it is simply a case of the sealing function having to be implemented, wherein a defined compression of the seal always takes place which always ensures the desired optimal functionality. In this case, seals may be made up of foams or rubber-like materials or a combination of a plurality of materials such as foam, plastics or metal. Thus, a reliable sealing function relative to water, air and partially also acoustic shielding is ensured by all these different sealing materials without the sealing materials having to be sealed by a further compression region.

In an embodiment, the flange comprises a fixing element on which the slide is able to be blocked after the opening of the partition has been sealed. This has the advantage that, after the sealing process, the flange is no longer able to leave the initially set position and the seal is reliably ensured. A compensation of the assembly tolerances in the Y-direction and/or Z-direction which are perpendicular to the direction of travel of the motor vehicle is typically uncritical here as in this case the seal has to be dimensioned larger than the opening in the partition by the tolerances in these directions. The compensation of said assembly tolerances has no effect on the actual functionality of the seal.

In a development, an additional seal is arranged between the slide and the flange. Said additional seal serves, in particular, for sealing the lines passed into the interior of the flange fixed to the housing, relative to soiling of the engine compartment.

In order to be able to implement the sealing function reliably and in terms of construction without great expenditure, the seal is fastened to a projection of the slide opposing the partition. Thus, when the assembly tolerance between the functional unit and the partition is to be compensated by the flange, the seal is already moved in the direction of the partition and reliably compressed there against the partition. As a result, the number of operating steps when assembling the functional unit in the motor vehicle is reduced.

In a variant, a spacer is arranged above the seal on the projection of the slide opposing the partition. Said spacer is dimensioned so that it corresponds to the optimal degree of compression of the seal relative to the partition, so that the maximum sealing effect is present when compressing the seal against the partition.

In an embodiment, the seal has an extension which extends at least partially on one side of the flange remote from the slide and comes into contact with at least one line. By this arrangement, an additional seal may be dispensed with as only one seal protects both the opening in the partition and the lines which are passed through the opening against soiling from the engine compartment. The seal to the partition and to the lines is configured in this case in one piece and ensures the compensation of the assembly tolerance by sliding the entire seal along the lines.

In a development, the extension of the seal, in particular on the side of the flange remote from the slide, has a folding bellows. Said folding bellows has the advantage that the part of the seal which is in contact with the line is rigidly fixed to the flange fixed to the housing and the line, so that the sliding movement of the seal on the line is prevented. In this case, during the movement of the flange the folding bellows serves for the compensation of the assembly tolerance as only the part of the seal which is arranged upstream of the folding bellows is moved relative to the partition. The rigid connection of the end of the seal to the line thus leads to an increase in the sealing effect of the arrangement provided.

In a variant, a grip-like element is arranged on the slide or the seal, said grip-like element protruding through the opening of the partition into the engine compartment. By means of said grip-like element, the assembly of the seal and the compensation of the assembly tolerance may be easily implemented from the engine compartment, as substantially more space is generally present here for assembly maneuvers to be carried out than in the footwell of the vehicle interior.

The element is also able to be provided with a set rupture point which ensures the application of a defined force. If the required minimum contact force is reached, the grip-like element breaks off. This may also be used for quality assurance. If the element is still present, this means that the seal is not yet in the desired position. If the element is no longer present this means that the seal is correctly mounted.

In a further variant, the lines are configured as media lines which serve for supplying the functional unit, in particular an air conditioning unit, with liquid media. The solution according to the invention, in particular when using media lines which transport liquid media such as coolant or cooling water from the engine compartment into the vehicle interior and back again, ensures a reliable seal of the engine compartment relative to the vehicle interior.

Figure 2:
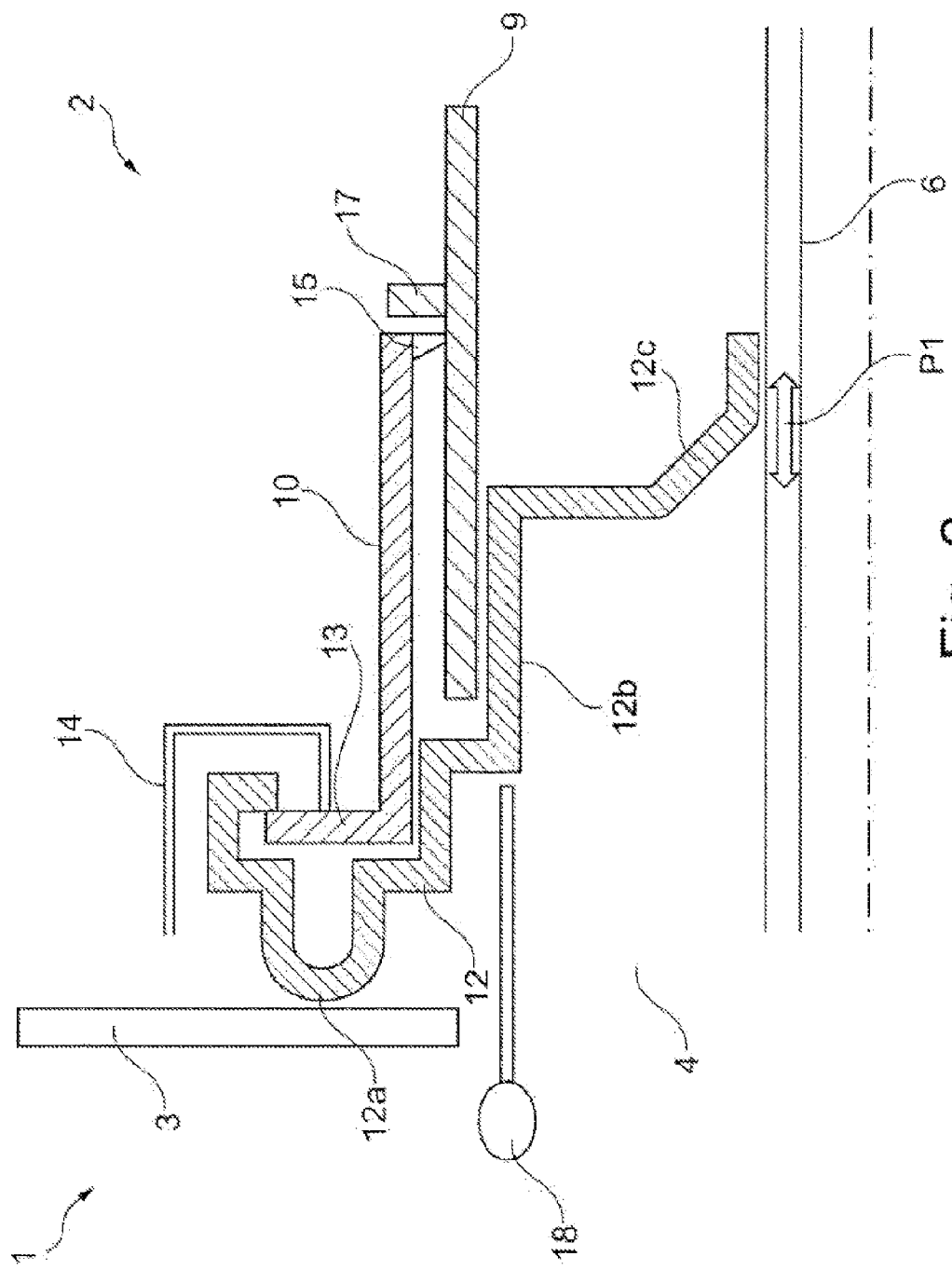
Figure 3:
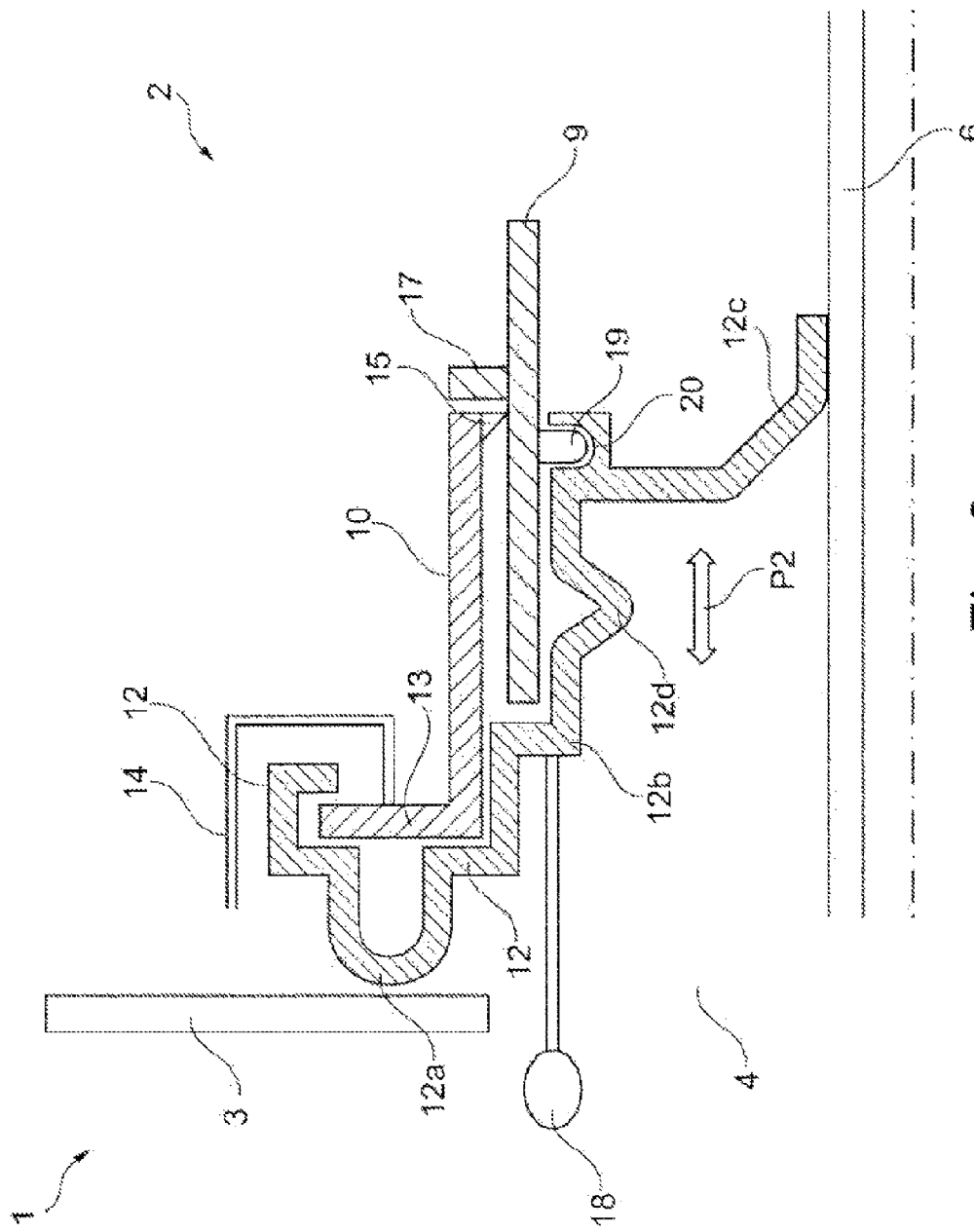
Figure 4:
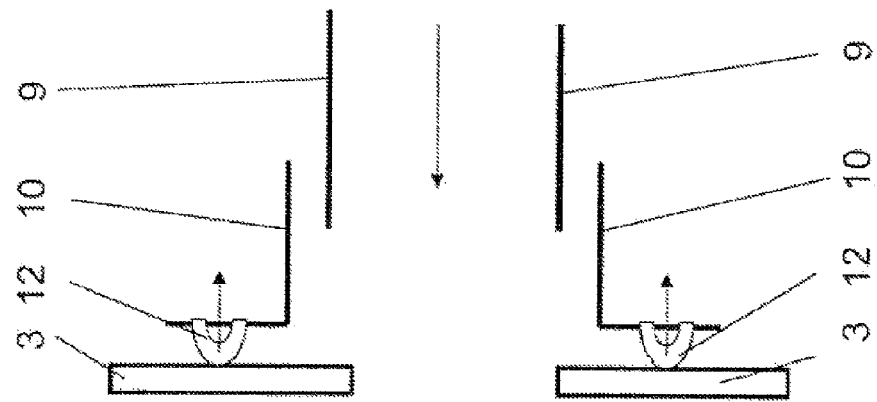
Figure 5:
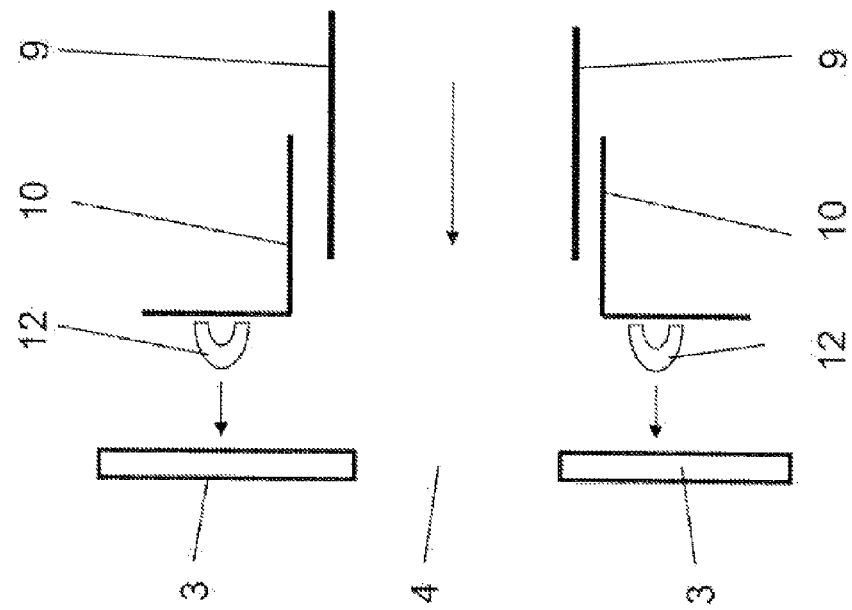

The invention permits numerous embodiments. One embodiment is to be described in more detail with reference to the figures shown in the drawings, in which:

FIG. 1: shows a first exemplary embodiment of the arrangement according to the invention with a multi-part seal FIG. 2: shows a second exemplary embodiment of the arrangement according to the invention with a one-piece seal FIG. 3: shows a third exemplary embodiment of the arrangement according to the invention with a one-piece seal and a folding bellows FIG. 4: shows the seal during assembly at a maximum distance from the partition FIG. 5: shows the seal during assembly at a minimum distance from the partition.

The same features are denoted by the same reference numerals.

In FIG. 1 a first exemplary embodiment of the arrangement for sealing line interfaces in a motor vehicle is shown in a cross section which extends in the direction of travel of the motor vehicle. The lines are configured as media lines. The motor vehicle consists of an engine compartment 1 and a vehicle interior 2. The engine compartment 1 and the vehicle interior 2 are separated by a partition 3 which has an opening 4, through which the media lines 5, 6 extend from the engine compartment 1 into the vehicle interior 2. The media lines 5, 6 contain cooling water and/or coolant and are supplied to an air conditioning unit, not shown further, which is arranged in the vehicle interior below the cockpit. The media lines 5 and 6 are in this case attached via an adapter 7 to the connectors in the engine compartment 1. The media lines 5 and 6 are introduced into a hollow flange 9 which is fixedly connected to the air conditioning unit, not shown further. The flange 9 is able to be of cylindrical design with a round, square or rectangular cross section. Around the flange 9 following the outer contour thereof extends a slide 10 movably mounted thereon, wherein an additional seal 11 is arranged between the slide 10 and the flange 9. Said additional seal 11 in this case serves for sealing between the slide 10 and the flange 9. A sealing element 8 which seals between the flange 9 and the media lines 5 and 6 is located inside the flange 9.

The slide 10 approximately encloses the entire flange 9 and extends in the longitudinal extent of the flange 9, wherein the slide 10 is configured to be movable in this direction. On the side opposing the partition 3 the slide 10 has a projection 13 extending parallel to the partition 3, on which a spacer 14 is angled back in the direction of the partition 3. A seal 12 is arranged below the spacer 14 on the front surface of the projection 13, said seal in the compressed state encompassing the entire opening 4 of the partition 3.

For moving the slide 10, said slide has a grip-like element 18 which acts through the opening 4 of the partition into the engine compartment 1 and is configured as an extension of the slide 10. For assembling the air conditioning unit, the grip-like element 18 is moved from the direction of the engine compartment 1 in the direction of the engine compartment 1, whereby the slide 10 moves and the seal 12 is compressed. The assembly tolerance is compensated when installing the air conditioning unit in the vehicle interior by the movement of the flange 9 relative to the slide 10. The seal 12 fastened to the projection 13 of the slide 10 is thereby pressed against the partition 3 and to such an extent that the spacer 14 which faces in the direction of the partition 3 comes into contact with the partition 3. The desired compression of the seal 12 relative to the partition 3 is present by means of the spacer 14. Thus, the maximum sealing effect of the seal 12 is achieved and a reliable seal of the engine compartment 1 relative to the vehicle interior 2 is present.

In order to anchor this position in a fixed manner, a projection 15 is formed on the side of the slide 10 opposing the grip-like element 18, said projection facing in the direction of the surface of the flange 9. The surface of the flange 9 has in this case a plurality of catches 16, wherein depending on the degree of compression present the projection 15 of the slide 10 is anchored in the catch 16 of the flange 9 corresponding to the position of the slide 10. As when assembling the air conditioning unit the slide 10 is displaced relative to the flange 9 which is rigidly fixed to the air conditioning unit and the partition 3, the assembly tolerance is also fixedly set by the catch 16 opposing the projection 17. For fixing the movable slide 10, the catches 16 thus operate according to the same principle as a cable tie. Moreover, a stop 17 is arranged on the flange 9, said stop being positioned downstream of the catches 16 and adjusting the position of the slide 10 before the assembly procedure.

In the disclosed first exemplary embodiment, the slide 10 slides on the flange 9 which is fixedly arranged on the air conditioning unit. The grip-like element 18 for moving the slide 10 and which acts in the engine compartment ensures sufficient contact force and control of the assembly procedure. In this case, after the mounting procedure has taken place, the grip-like element 18 which may be simply configured in the form of a tab, is able to be detached when the seal 12 and the air conditioning unit have adopted the correct position.

In FIG. 2 a second exemplary embodiment of the invention is shown, wherein only half of the construction of the arrangement shown in FIG. 1 is revealed. In this embodiment, the seal 12 is also fastened to a slide 10 which is movably arranged parallel to the flange 9 which is arranged fixed to the housing on the air conditioning unit, not shown further. The seal 12 is configured in this case in one piece, wherein the additional seal 11 shown in FIG. 1 and the sealing element 8 are able to be dispensed with. The seal 12 consists of a plurality of portions and has on the front surface of the projection 13 of the slide 10 a C-shaped part 12a which is responsible for the seal relative to the partition 3. Said C-shaped part 12a is wrapped around the free end of the projection 13 and fastened thereto. Proceeding from the C-shaped part 12a, the seal 12 extends in a step-like manner below the slide 10 and then engages with a second part 12b in the interior of the hollow flange 9, in which the media lines, of which only the media line 6 is shown, also extend. The part 12b which is designed approximately parallel to the side of the flange 9 remote from the slide 10, and extends in a freely movable manner, is adjoined to a foot-like part 12c which is in contact with the media line 6 and forms a seal therewith.

During the movement of the slide 10, the seal 12 which is formed in one piece slides with its foot-like part 12c along the media line 6. By sliding the entire seal 12 along the media line 6 the assembly tolerance is compensated when installing the air conditioning unit, not shown further, in the vehicle interior, which is indicated by the arrow P1. The seal 12 and the slide 10 in this case form an integrated component, wherein the spacer 14 has a hook-like shape for ensuring the desired compression of the first part 12a of the seal 12 on the partition 3, wherein said spacer 14 originates from the side of the projection 13 remote from the first part 12a of the seal 12 and by means of the double bend of approximately 90° protrudes over the first part 12a of the seal 12.

The grip-like element 18 is configured in this case as an extension of the second part 12b of the seal 12 and also in this case protrudes through the opening 4 of the partition 3 into the engine compartment 1. As the seal 12, shown in connection with FIG. 2, is fixedly connected to the slide 10, by the movement of the grip-like element 18 in the direction of the engine compartment both the slide 10 and the seal 12 move in the direction of the partition 3, wherein the seal 12 slides along the media line 6. In this case, the slide 10 and the seal 12 consist of different materials. Whilst both the slide 10 and the flange 9 consist of a solid material, preferably a plastics material, the seal 12 consists of a resilient material, advantageously a rubber.

FIG. 3 shows a third exemplary embodiment in which the seal 12 is also configured in one piece, said seal differing from the exemplary embodiment according to figure in that the second part 12b of the seal 12 which is designed to be freely movable, approximately parallel to the flange 9, has a folding bellows 12d. In this case, the foot part 12c of the seal 12 is rigidly fixed to the media line 6. Moreover, the seal 12 has a receiver 20 relative to the foot part 12c into which a projection 19 engages, said projection being configured on the inner face of the flange remote from the slide 10. As a result, the seal 12 is fixedly anchored both to the flange 9 fixed to the housing and to the media line 6, so that a displacement of the seal 12 on the media line 6 is reliably prevented.

If the grip-like element 18, which in turn protrudes through the opening 4 of the partition 3 into the engine compartment 1, is now pulled in the direction of the engine compartment 1, the folding bellows 12d is pulled apart, wherein the foot-like part of the seal 12 is held in its originally adopted position. The compensation of the assembly tolerance of the air conditioning unit which has to be present during the assembly procedure thus takes place by means of the folding bellows 12d, which is indicated by the arrow P2.

In FIGS. 4 and 5, the assembly sequence of the arrangements described in the previous paragraphs are shown schematically. In this case, for clearer understanding only the partition 3, the opening 4, the slide 10, the seal 12 and the flange 9 are shown. During the assembly procedure, two methods are conceivable. In a first variant, the seal 12 in FIG. 4 is mounted in a parked position, wherein a maximum spacing is present relative to the partition 3. This position is used, in particular, in FIGS. 1 to 3. After assembling the air conditioning unit, for compensating the assembly tolerances, the seal 12 and/or the slide 10 are pulled relative to the flange 9 to the front into the desired position, which is characterized by the arrows in the direction of the partition.

In the position shown in FIG. 5, the seal 12 is already located directly on the partition 3. When assembling the air conditioning unit, the seal 12 is displaced at the same time into the correct position away from the partition 3, whilst the flange 9 connected rigidly to the air conditioning unit is moved toward the partition 3. As a result, an additional operating step is not necessary in order to align both the air conditioning unit with the desired assembly tolerance and to bring the seal 12 into the desired compression. For maintaining the compressive force on the seal 12, the flange 9 and/or the slide 10 are provided with a suitable fixing device 15, 16 which, for example, may be a catch similar to said fixing device on a cable tie or a screw connection, pin connection or similarly suitable fixing means. The use of spring-like elements is also conceivable. Moreover, the displaceable region has to be designed so that in this case the requirements regarding sealing and acoustics are also maintained.

The solution according to the invention permits the function of sealing and the compensation of assembly tolerance in the direction of travel to be divided between different components at the media interface. This permits the use of a plurality of sealing materials for sealing the media interface and ensures the functionality of the seal despite the current tolerance position of the air conditioning unit in the vehicle.

The invention claimed is:

1. An arrangement for sealing line interfaces in a motor vehicle in which at least one line from an engine compartment of the motor vehicle is passed into a vehicle interior,
   wherein the engine compartment is separated from the vehicle interior by a partition which has an opening through which the at least one line is passed and the opening is closed on the vehicle interior side by a seal which is fastened to a functional unit arranged in the vehicle interior,
   wherein the seal is fastened to a slide which is movably mounted relative to a longitudinal extent of a flange which is rigidly arranged on the functional unit and which is configured approximately perpendicular to the opening of the partition,
   wherein the flange comprises a fixing element on which the slide is able to be blocked after the opening of the partition has been sealed.

2. The arrangement as claimed in claim 1, wherein an additional seal is arranged between the slide and the flange.

3. The arrangement as claimed in claim 1, wherein a grip-like element is arranged on the slide or on the seal, said grip-like element protruding through the opening of the partition into the engine compartment.

4. The arrangement as claimed in claim 1, wherein the at least one line is configured as media lines which serve for supplying the functional unit, in particular an air conditioning unit, with liquid media.

5. An arrangement for sealing line interfaces in a motor vehicle in which at least one line from an engine compartment of the motor vehicle is passed into a vehicle interior,
- wherein the engine compartment is separated from the vehicle interior by a partition which has an opening through which the at least one line is passed and the opening is closed on the vehicle interior side by a seal which is fastened to a functional unit arranged in the vehicle interior,
- wherein the seal is fastened to a slide which is movably mounted relative to a longitudinal extent of a flange which is rigidly arranged on the functional unit and which is configured approximately perpendicular to the opening of the partition,
- wherein the seal is fastened to a projection of the slide opposing the partition,
- wherein a spacer is arranged above the seal on the projection of the slide opposing the partition.

6. The arrangement as claimed in claim 5, wherein the seal has an extension which extends at least partially on one side of the flange remote from the slide and comes into contact with at least one line.

7. The arrangement as claimed in claim 6, wherein the extension of the seal, in particular on the side of the flange remote from the slide, has a folding bellows.

8. The arrangement as claimed in claim 5, wherein a grip-like element is arranged on the slide or on the seal, said grip-like element protruding through the opening of the partition into the engine compartment.

9. The arrangement as claimed in claim 5, wherein the at least one line is configured as media lines which serve for supplying the functional unit, in particular an air conditioning unit, with liquid media.

* * * * *